United States Patent Office 3,087,238
Patented Apr. 30, 1963

3,087,238
TELL-TALE INDICATOR FOR HEAT PROCESSES AND METHOD OF USING IT
Ralph B. Nottingham, 1091 S.E. 12 Terrace, Deerfield Beach, Fla.
No Drawing. Filed Oct. 6, 1958, Ser. No. 765,305
9 Claims. (Cl. 29—407)

This invention relates to a "tell-tale" indicator for heat processes, such as soldering or the heat curing of molded plastic products, and to processes involving the use of such indicator.

Recent advances in technology, particularly in the field of guided missiles, have imposed extremely stringent requirements upon the completeness and accuracy with which soldered connections in electrical circuitry must be made. A single connection which the operator missed soldering altogether, or which was cold soldered, may cause a malfunction serious enough to result in the destruction of the entire complicated and expensive instrument. Even where the consequences are not so disastrous, there would still be the tedious and expensive trouble-shooting job of locating the faulty connection and correcting it.

The present invention is directed to a novel indicator which enables a quick check to be made as to whether all of the soldered connections in an electrical circuit have been made properly.

Another application of the present invention is in the plumbing field. Where a plumbing contractor installs a complete copper piping system for a house or other building, it is not uncommon to find a few leaks at the soldered connections in the system. Commonly, such leaks are detected by turning on the water and noting visually where such leaks occur. Due to the extremely high heat conductivity of copper, it is not possible to re-solder the defective joints as long as any water remains in the pipes. Therefore, it is necessary to drain the system, and this is usually done by blowing air through the pipes. Only then can the defective joints be re-soldered. Because of the lack of a reliable indicator which would tell at a glance whether the joint was soldered correctly, this tedious, time-consuming and expensive procedure must be followed to insure that no leaks are present. By applying the indicator material of the present invention at the joints which are to be soldered a quick visual check for defectively soldered joints may be made before the water is turned on, so that the entire procedure may be simplified and shortened considerably.

A still further application of this invention is in the heat curing of plastic products, particularly thermo-setting resin products. By the use of the present indicator one may determine readily whether the product has been properly cured in the desired manner.

In accordance with the present invention, there is provided an indicator material which is stable and is readily detectable, such as visually, at normal ambient temperatures and which volatilizes and disappears without leaving an objectionable residue when heat is applied. This indicator material is applied ahead of time to the article or material which is to be subjected to a process involving the application of heat, such as soldering or heat curing. If the indicator material disappears, this indicates that the heat process has been performed successfully. If the indicator material is still present, this indicates that the heat process was either not performed at all or improperly performed.

Accordingly, it is an object of this invention to provide a novel "tell-tale" indicator for indicating whether a heat process has been performed properly.

It is also an object of this invention to provide a novel "tell-tale" indicator which by its disappearance indicates that a heat process has been performed properly.

Another object of this invention is to provide a novel process in which such an indicator is employed to indicate whether a step involving the application of heat has been properly performed.

Other objects and advantages of the present invention will become apparent from the following detailed description of certain suitable embodiments of the indicator material and applications thereof.

In practice, effective results have been obtained with an indicator material made up of dyed paraffin wax or a dyed resin, which in either case is volatilizable when subjected to sufficient heat and leaves no objectionable residue.

In general, azo-type aniline dyes have been found to be suitable for use as the dye in the indicator material of the present invention. One such dye is sold by National Aniline Division, Allied Chemical and Dye Corporation, Buffalo, New York, under the name "Azo Oil Blue Black B." The dye used should be such that it disappears when the paraffin or other vehicle volatilizes upon the application of the heat involved in the process being checked and leaves no objectionable residue. Any suitable dye having these characteristics may be used.

If desired, the indicator material may be fluorescent to facilitate its detection in the event that the heating step is omitted or is defectively performed. An example of an indicator material of this type which is suitable is fluorescein, which may be dissolved in alcohol before being applied.

I have avoided the use of a pigment as the coloring material because of its tendency to leave a residue after being subjected to heat.

The dyed paraffin or resin may be in a suitable solvent, such as naphtha or alcohol so that the material is in a liquid or flowing state when applied. The solvent should be non-toxic, should evaporate at the ambient temperatures to which the completed article is normally subjected, and should leave no objectionable residue after evaporating.

In lieu of using such a solvent, the dyed paraffin or resin may be applied in a liquid or flowing state to the terminal post, after which it solidifies upon cooling.

After a coating of this indicator material has been applied to an electrical terminal which is to be soldered, it is readily visible to the naked eye. When a wire is properly soldered to the terminal, the previously visible coating will vanish under the action of the heat involved in the soldering, leaving no residue which might interfere with the desired bond between the terminal and the wire.

Since the melting points for various solders range from about 334° F. to 558° F., the material of the coating should be so chosen that it will volatilize completely at the soldering temperature involved. However, it should remain stable at the normal ambient temperatures to which the terminal is exposed prior to soldering, which should rarely exceed 100° F.

In the great majority of instances involving a defective soldering job, the operator will have completely omitted making one or more of the soldered connections. In such cases, the missed connection will retain its readily visible, distinctively colored coating, so that it can be detected at a glance.

In the case of a soldered connection which was attempted, but improperly performed, the present coating may or may not remain, depending upon the heat to which it has been subjected.

However, by enabling the detection of the omitted solder connections, which account for the vast majority of defects, the present invention enables the quality control factor to be raised to an order of accuracy which was impossible in practice heretofore, even with the most carefully chosen and supervised skilled personnel.

If desired, the indicator coating may be such that it can be detected only when exposed to special light, such as ultra-violet light. Alternatively, it may have a detectable substance which is detected in a manner other than visual, such as by radioactivity, and which substantially disappears when subjected to the usual amount of heat involved in the process being checked.

For plumbing applications, a stripe of the present indicator material may be applied to a fitting or to the copper tubing where the soldered connection is to be made. If the soldered joint is not completed all the way around the pipe or the correct soldering temperature was not reached, the coating should remain visible there, where it may be detected readily upon a spot inspection of all the soldered joints prior to turning on the water.

In the curing of plastic articles, the present indicator material may be deposited on the plastic article. This material will disappear in the heat curing oven, which may operate within the range from about 100° F. to 400° F. However, if the operator fails to put the articles in the oven, or the oven does not operate properly, or for some other reason any portion of the article is not subjected to the desired heat treatment, the coating will give a tell-tale visual indication.

While particular examples have been given herein for the present invention, it is to be understood that it may be applied to various other processes which involve the application of heat and that the indicator material itself may be different from the specific illustrative examples given, all without departing from the spirit and scope of this invention.

Having thus described my invention, I claim:

1. A tell-tale indicator for heat processes in the form of a liquifiable coating material consisting solely of volatilizable colored wax or colored resin, said coating material being adapted to be applied as a liquid coating on an article and thereafter to solidify while retaining its color at the normal ambient temperatures to which said article is ordinarily subjected, said coating material being substantially completely volatilizable to disappear without leaving an objectionable residue when subjected to heat substantially in excess of said normal ambient temperatures.

2. A tell-tale indicator for heat processes in the form of a liquifiable coating material consisting solely of volatilizable colored wax or colored resin, said coating material being applicable as a liquid coating onto an article and after application being solidifiable while retaining its color below about 100° F., said coating material being completely volatilizable to disappear without leaving an objectionable residue when subjected to heat substantially above 100° F.

3. A tell-tale indicator for heat processes in the form of a dyed coating material consisting solely of volatilizable dyed wax or dyed resin which is adapted to be applied as a liquid coating onto an article and thereafter to solidify while retaining the dye at temperatures below 100° F., said coating material being substantially completely volatilizable to disappear without leaving an objectionable residue when subjected to heat substantially above 100° F.

4. A tell-tale indicator for heat processes in the form of paraffin dyed with an azo-type aniline dye, said dyed paraffin being stable below 100° F. and being volatilizable to disappear without leaving an objectionable residue when subjected to heat substantially above 100° F.

5. In a method of treating an article which involves applying heat thereto, the steps of: applying to the article a coating material in a flowing state having a visible substance, said coating material after being applied being solidifiable while retaining said visible substance at the normal ambient temperatures to which said article is ordinarily subjected said coating material being substantially completely volatilizable to disappear without leaving a residue when subjected to heat substantially in excess of said normal ambient temperatures; and thereafter subjecting the article to heat substantially in excess of said normal ambient temperatures.

6. In a method of soldering an article, the steps of: applying to the article a coating material in a flowing state having a visible substance, said material after being applied being solidifiable while retaining said visible substance at temperatures below about 100° F., said coating material being substantially completely volatilizable to disappear without leaving an objectionable residue when subjected to heat substantially above 100° F.; and, after said coating material has been applied and has solidified, soldering the article where said coating material has been applied.

7. In a method of manufacturing a plastic article, the steps of: applying to the plastic a coating material in a flowing state having a visible substance, said coating material after being applied being solidifiable while retaining said visible substance at temperatures below about 100° F. and being substantially completely volatilizable to disappear without leaving an objectionable residue when subjected to heat substantially above 100° F.; and thereafter curing the plastic by heat at a temperature substantially above 100° F.

8. In a method of soldering an article, the steps of: applying to the article paraffin dyed with an azo-type aniline dye, said dyed paraffin being stable below about 100° F. and being volatilizable to disappear without leaving an objectionable residue when subjected to heat substantially above 100° F.; and thereafter soldering the article where said dyed paraffin has been applied.

9. In a method of soldering an article, the steps of: applying to the article a dyed resin coating material in a flowing state, said dyed resin coating material after being applied to the article being solidifiable while retaining its dye at temperatures below about 100° F., said dyed resin coating material being substantially completely volatilizable to disappear without leaving an objectionable residue when subjected to heat substantially above 100° F.; and, after said dyed resin coating material has been applied to the article and has solidified, soldering the article where said dyed resin coating material has been applied.

References Cited in the file of this patent

UNITED STATES PATENTS

| Number | Name | Date |
| --- | --- | --- |
| 1,000,673 | Diack | Aug. 15, 1911 |
| 1,630,485 | Gerdts | May 31, 1927 |
| 1,774,386 | Lard | Aug. 26, 1930 |
| 1,938,583 | Derbg | Dec. 12, 1933 |
| 2,020,676 | Ellis | Nov. 12, 1935 |
| 2,292,396 | Olin | Aug. 11, 1942 |
| 2,616,384 | McBride | Nov. 4, 1952 |
| 2,628,417 | Peyches | Feb. 17, 1953 |
| 2,635,293 | France | Apr. 21, 1953 |
| 2,838,593 | Scesa | June 10, 1958 |